Patented Mar. 30, 1954

2,673,851

UNITED STATES PATENT OFFICE 2,673,851

NEW VAT DYE OF THE PYRAZOLANTHRONYL BENZANTHRONE SERIES

Mario Scalera and Harry Edward Westlake, Jr., Somerville, N. J., assignors to American Cyanamid Company, New York, N. Y., a corporation of Maine No Drawing. Application October 2, 1952,
Serial No. 312,856

4 Claims. (Cl. 260—275)

The present invention relates to vat dyestuffs of the pyrazolanthronyl-benzanthrone series and a process of preparing them.

We have found that new valuable vat dye-stuffs of the pyrazolanthronyl-benzanthrone series are obtained by fusion at a temperature of 130–160° C. of 6-bromo-Bz-1-pyrazolanthronyl benzanthrone or its 6-chloro analog until the halogen is substantially eliminated from the molecule.

Although the exact structure of the halogen-free dyestuff is not known, it is presumed that a ring closure occurs to form the acridine. The resulting product is a navy blue dyestuff of greenish shade. Such a shade is very desirable in the trade, since most of the navy blues available in the market are of a red shade. In addition, this new dyestuff has fastness to light and other reagents much superior to the common navy blue dyestuffs, such as dibenzanthrone (Indanthrene Dark Blue BO).

The halogenated pyrazolanthronyl benzanthrone which we use as a starting material may be synthesized by the reaction of dibromo or dichloro benzanthrone with pyrazolanthrone to give 6-bromo-, or 6-chloro-Bz-1-pyrazolanthronyl benzanthrone. Our starting material may also be prepared by direct halogenation of benzanthronylpyrazolanthrone in nitrobenzene.

The fusion at high temperatures of this 6-bromo-Bz-1-pyrazolanthronyl benzanthrone probably forms as a nucleus for our new dyestuff the acridine from pyrazolanthrone and benzanthrone, known to be a navy blue dye, but the disappearance of the halogen from the other side of the molecule gives a product which is entirely different. The group which replaces the halogen is not known with any degree of exactitude. Some of the halogen is replaced by methoxyl groups and it is strongly possible that there is also present in the dye mixture hydroxyl groups or perhaps ether linkages which link two such acridine nuclei together. If hydroxyl groups are present, it is surprising that the resulting dyes should have such excellent fastness properties, as hydroxyl groups normally decrease both light- and wash-fastness.

In order to cause the substantially complete elimination of halogen, it is necessary to fuse at temperatures above the 100° C. normally used for ring closure. Temperatures above 130° C. will give substantial amounts of the new navy blue dyestuff which we have discovered. As the temperature is elevated, more dyestuff is formed until at the optimum conditions (140–150° C.) substantially all the halogen is eliminated. Below 110° C. the removal of halogen is so slow that unless heating is continued for an unreasonable time the product will be a halogenated acridine of much less desirable shade. Heating the reaction mixture at higher temperature or longer than necessary to eliminate halogen, results in an unsatisfactory gray shade.

Our invention can be illustrated by the following examples in which the parts are by weight unless otherwise specified.

EXAMPLE 1

*Mono-bromo-bz-1-benzanthronyl-py-1-pyrazolanthrone*

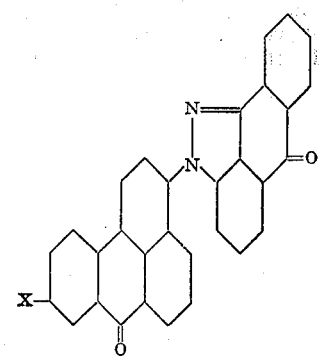

Twenty-two parts of pyrazolanthrone and 40 parts of Bz-1-dibromobenzanthrone is stirred for 7 hours at boiling temperature in the presence of 15 parts of potassium carbonate and about 0.5 part of copper carbonate in 300 parts of nitrobenzene. The mono-bromo-benzanthronylpyrazolanthrone which separates on cooling has a melting point of 367° C.

EXAMPLE 2

A mixture of 125 parts of potassium hydroxide and 62 parts of methanol is stirred at 120° C. Twenty-five parts of 6-bromo-Bz-1-pyrazolanthronyl benzanthrone (see Example 1 above) is gradually added. The mixture is then stirred at 140–145° C. until the halogen elimination is substantially complete. The melt is drowned in water and aerated until the precipitation of the dyestuff is complete. The product is isolated by filtration and washing. The product dyes cellulose fibers, when applied in the usual manner, a strong bright-green shade of navy blue of excellent fastness, especially to light.

If the temperature is held at 115° C. instead of 140–145° C. it is found that a small amount of the bromine remains. The dyestuff is not too different in shade from that produced at the higher temperature, although weaker in tinctorial strength. If the temperature is held at 100° C., substantial quantities of the halogen remain in the final dye and the shade is much different than that obtained at 140-145° C.

The corresponding 6-chloro-Bz-1-pyrazolanthronyl benzanthrone can be used equivalently with the bromo compound.

We claim:

1. The process of preparing a greenish-navy blue dyestuff which comprises fusing a compound having the formula:

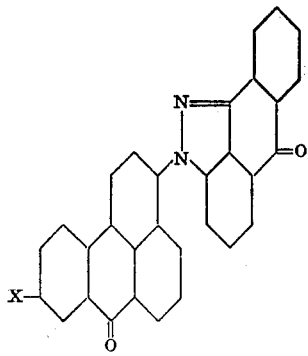

in which X is selected from the group consisting of chlorine and bromine, with alcoholic caustic at a temperature greater than 110° C. but not greater than 150° C. until the resulting product is substantially free of halogen.

2. A process of preparing a greenish-navy blue dyestuff which comprises fusing one part of 6-bromo-Bz-1-pyrazolanthronyl benzanthrone with a solution of about 5 parts potassium hydroxide in methanol at 130-150° C. to obtain a dyestuff substantially free of bromine.

3. The greenish-navy blue dyestuff which is obtained by fusion of a compound having the formula:

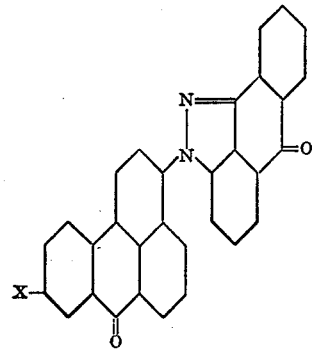

in which X is selected from the group consisting of bromine and chlorine, with alcoholic caustic at 130-150° C. to remove substantially all the halogen from said compound.

4. The greenish-navy blue dyestuff which is obtained by fusing one part of 6-bromo-Bz-1-pyrazolanthronyl benzanthrone with a solution of about 5 parts potassium hydroxide in methanol at 130-150° C. until substantially free of bromine.

MARIO SCALERA.
HARRY EDWARD WESTLAKE, Jr.

References Cited in the file of this patent

UNITED STATES PATENTS

| Number | Name | Date |
| --- | --- | --- |
| 1,790,780 | Wilke | Feb. 3. 1931 |